US012214559B2

(12) United States Patent
Barrett

(10) Patent No.: US 12,214,559 B2
(45) Date of Patent: Feb. 4, 2025

(54) PIPE FORMING APPARATUS

(71) Applicant: NEXGEN PIPES PTE. LTD., Singapore (SG)

(72) Inventor: Wayne Barrett, Surfers Paradise (AU)

(73) Assignee: NEXGEN PIPES PTE. LTD., Forum (SG)

(*) Notice: Subject to any disclaimer, the term of this patent is extended or adjusted under 35 U.S.C. 154(b) by 225 days.

(21) Appl. No.: 17/776,992

(22) PCT Filed: Jul. 31, 2020

(86) PCT No.: PCT/IB2020/057241
§ 371 (c)(1),
(2) Date: May 13, 2022

(87) PCT Pub. No.: WO2021/094840
PCT Pub. Date: May 20, 2021

(65) Prior Publication Data
US 2023/0085379 A1 Mar. 16, 2023

(30) Foreign Application Priority Data
Nov. 15, 2019 (AU) .................. 2019904309

(51) Int. Cl.
*B28B 1/24* (2006.01)
*B28B 7/00* (2006.01)
(Continued)

(52) U.S. Cl.
CPC ............... *B29C 70/32* (2013.01); *B28B 1/24* (2013.01); *B28B 7/0002* (2013.01); *B28B 7/28* (2013.01);
(Continued)

(58) Field of Classification Search
CPC ......... B29C 70/32; B29C 33/04; B29C 33/46; B29C 45/0003; B29C 45/14598;
(Continued)

(56) References Cited

U.S. PATENT DOCUMENTS 4,558,971 A 12/1985 David
4,849,150 A * 7/1989 Kittaka ............... B29D 23/001
264/258

(Continued)

FOREIGN PATENT DOCUMENTS

CA 2171267 A1 9/1997
CA 2561402 A1 4/1999
(Continued)

OTHER PUBLICATIONS

Office Action issued in corresponding Canadian Patent Application No. 3,161,135 dated Jan. 5, 2024.
(Continued)

*Primary Examiner* — Nahida Sultana
(74) *Attorney, Agent, or Firm* — SQUIRE PATTON BOGGS (US) LLP

(57) ABSTRACT

According to the present invention, there is provided a pipe forming apparatus for forming a pipe at an installation site. The apparatus includes a former upon which material is wound, and a mold for receiving the former bearing the wound material. An applicator is provided for applying curable liquid within the mold. Advantageously, the pipe is formed at site to provide for efficient formation of a pipeline. A transported ISO container providing the material and curable liquid to the site can produce 800 metres of pipeline section, compared with 60 metres in the prior art, representing a significant increase in efficiency.

16 Claims, 3 Drawing Sheets

(51) Int. Cl.

| | |
|---|---|
| *B28B 7/28* | (2006.01) |
| *B28B 7/36* | (2006.01) |
| *B28B 21/38* | (2006.01) |
| *B28B 21/42* | (2006.01) |
| *B29C 33/04* | (2006.01) |
| *B29C 33/46* | (2006.01) |
| *B29C 45/00* | (2006.01) |
| *B29C 45/14* | (2006.01) |
| *B29C 53/70* | (2006.01) |
| *B29C 65/52* | (2006.01) |
| *B29C 70/18* | (2006.01) |
| *B29C 70/32* | (2006.01) |
| *B29C 70/46* | (2006.01) |
| *B29C 70/48* | (2006.01) |
| *B29D 23/00* | (2006.01) |
| *F16L 1/038* | (2006.01) |
| *F16L 9/12* | (2006.01) |
| *F16L 9/16* | (2006.01) |
| *B29L 23/00* | (2006.01) |

(52) U.S. Cl.
CPC ............... *B28B 7/36* (2013.01); *B28B 21/38* (2013.01); *B28B 21/42* (2013.01); *B29C 33/04* (2013.01); *B29C 33/46* (2013.01); *B29C 45/0003* (2013.01); *B29C 45/14598* (2013.01); *B29C 45/14631* (2013.01); *B29C 53/70* (2013.01); *B29C 65/52* (2013.01); *B29C 70/18* (2013.01); *B29C 70/462* (2013.01); *B29C 70/48* (2013.01); *B29D 23/001* (2013.01); *F16L 1/038* (2013.01); *F16L 9/12* (2013.01); *F16L 9/16* (2013.01); *B29L 2023/22* (2013.01)

(58) Field of Classification Search
CPC ... B29C 45/14631; B29C 53/70; B29C 65/52; B29C 70/18; B29C 70/462; B29C 70/48; B29C 70/06; B29D 23/001; F16L 1/038; F16L 9/12; F16L 9/16; F16L 1/00; B29L 2023/22; B29K 2101/10; B29K 2309/08
USPC .................................. 425/392–393
See application file for complete search history.

(56) References Cited

U.S. PATENT DOCUMENTS

| | | | |
|---|---|---|---|
| 5,221,391 A | 6/1993 | Kittaka et al. | |
| 2007/0220957 A1* | 9/2007 | Krah ................... | G01M 3/2807 |
| | | | 73/49.5 |
| 2012/0222771 A1 | 9/2012 | Burke et al. | |
| 2014/0261843 A1* | 9/2014 | Graham ..................... | B32B 5/12 |
| | | | 138/125 |
| 2015/0367876 A1 | 12/2015 | Heitz et al. | |
| 2016/0053922 A1 | 2/2016 | Ehsani | |
| 2017/0015071 A1 | 1/2017 | Heitz et al. | |
| 2018/0186102 A1 | 7/2018 | Barrett | |
| 2024/0051243 A1* | 2/2024 | Magnier ................ | B65H 49/32 |

FOREIGN PATENT DOCUMENTS

| | | |
|---|---|---|
| CN | 105 143 016 A | 12/2015 |
| CN | 204977492 U | 1/2016 |
| CN | 105415698 A | 3/2016 |
| CN | 106273533 A | 1/2017 |
| CN | 106415698 B | 8/2018 |
| CN | 109676953 A | 4/2019 |
| JP | S63-173625 A | 7/1988 |
| JP | H03-157591 A | 7/1991 |
| JP | 408 6847 B2 | 1/1996 |
| JP | 2001-026059 A | 1/2001 |

OTHER PUBLICATIONS

First Office Action issued in corresponding Chinese Patent Application No. 202080079047.5 dated Nov. 14, 2023, with English language machine translation thereof.

Notification of Reasons for Refusal issued in corresponding Japanese Patent Application No. 2022-527716 dated Feb. 27, 2024, with English language translation thereof.

Extended European Search Report issued in corresponding European Patent Application No. 20888624.2 dated Nov. 24, 2023.

International Search Report for PCT International Application No. PCT/IB2020/057241, 5 pages, dated Oct. 13, 2020.

* cited by examiner

PIPE FORMING APPARATUS

CROSS-REFERENCE TO RELATED APPLICATIONS

This application is a national-stage filing under 37 USC 371 (c) of International Application No. PCT/IB2020/057241, filed Jul. 31, 2020, which claims priority to, and the benefit of, Australian Patent Application AU2019904309, filed Nov. 15, 2019, the entire contents of each of which are herein incorporated by reference in their entirety for all purposes.

TECHNICAL FIELD

The present invention relates to a pipe forming apparatus for forming pipe at an installation site.

The present invention has particular, although not exclusive application to forming continuous pipe.

BACKGROUND

The reference to any prior art in this specification is not, and should not be taken as an acknowledgement or any form of suggestion that the prior art forms part of the common general knowledge.

Industrial oil and gas pipelines are laid in remote locations.

In practice, the pipes forming the pipelines are manufactured in factories and transported to the installation site. Typically, ISO transport containers can carry only five completed 12 metre pipes at a time, to form a 60 metre pipeline section, which greatly hampers efficiencies in building the pipeline.

The preferred embodiment provides for more efficient formation of industrial pipelines.

SUMMARY OF THE INVENTION

According to one aspect of the present invention, there is provided a pipe forming apparatus for forming a pipe at an installation site, said apparatus including:
  a former upon which material is wound;
  a mold for receiving the former bearing the wound material; and
  an applicator for applying curable liquid within the mold.

Advantageously, the pipe is formed at site to provide for efficient formation of a pipeline. A transported ISO container providing the material and curable liquid to the site may produce 800 metres of pipeline section, compared with 60 metres in the prior art, representing a significant increase in efficiency.

The apparatus may further include an advancer for advancing relative movement between the former and material during winding. The wound material at one end of the former may form a complementary fit with the other end. The ends may be stepped.

The former may include a rotating mandrel. The mandrel may use air pressure which could be released through various apertures/means assisting the pipe release. The cross-sectional area (CSA) of the former may be reduced when winding of the material, and increased when applying curable liquid. The former may include one or more wall segments that move inwardly when reducing the CSA, and outwardly when increasing the CSA. Each segment may be tapered.

The apparatus may include a lock for locking the former to a completed pipe, whilst enabling the former to rotate when winding material for another pipe. The apparatus may include a sleeve for surrounding the former. The sleeve may be formed from non-stick material (e.g. silicone).

The mold may form an airtight cavity in which the wound material is located. The mold may include end seals for sealing against the sleeve.

The application may include an injector. The curable liquid may include resin.

The apparatus may include a hot water system for heating the mold. The apparatus further includes a tracked vehicle for advancing the apparatus to produce a continuous pipe. The apparatus may include a holder for holding a roll of the material.

The material may be dry material. The material may include composite glass fibres. The material may be sheet material. The sheet material may be about 12 meters wide. The material may include an adhesive on its underside.

According to another aspect of the present invention, there is provided a method for forming a pipe at an installation site, said method including:
  winding material upon a former;
  receiving the former bearing the wound material within a mold; and
  applying curable liquid within the mold.

The method may involve advancing relative movement between the former and material during winding. The method may involve reducing the CSA of the former for winding. The method may involve increasing the CSA of the former for application of the liquid.

The method may involve applying an adhesive to the material prior to winding.

The method may involve the liquid curing to form the pipe. The method may involve forming another pipe adjacent the formed pipe. The method may involve fitting the pipes together. The method may involve molding the fitted pipes together in the mold.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
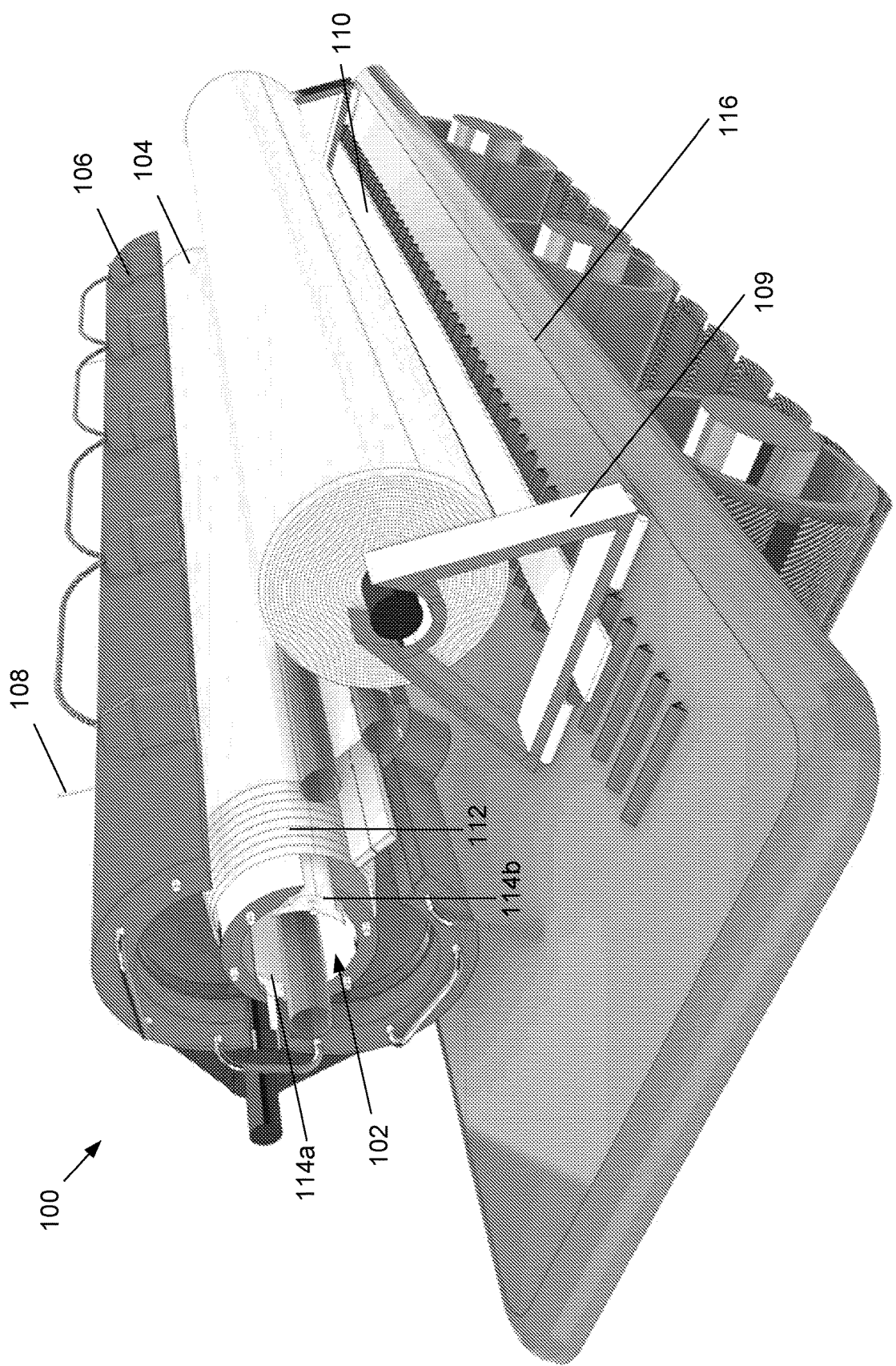
FIG. 1 is a schematic view of a pipe forming apparatus in accordance with an embodiment of the present invention, with the mold in an open position.

According to an embodiment of the present invention, there is provided a travelling pipe forming apparatus 100 shown in FIG. 1. The apparatus 100 forms a continuous industrial pipe at an installation site. The apparatus 100 includes a central former 102, in the form of a rotating mandrel, upon which dry sheet material 104 is wound. A mold 106 is provided for receiving the former 102 bearing the wound material 104. The apparatus 100 further includes an injector 108 (i.e. applicator) for injecting curable liquid resin to the material 104 within the mold 106.

Advantageously, the pipe is formed at its installation site to provide for efficient formation of a pipeline. An ISO container providing the material 104 and resin to the site can produce 600 metres of pipeline section, compared with 60 metres in the prior art, representing a significant increase in efficiency.

The apparatus 100 includes a holder 109 for holding a roll of the material 104. Further, the apparatus 100 includes a racking system 110 (i.e. advancer) for axially advancing the held material 104 along the former 102 during winding. In this manner, the ends of the wound material 102 form steps 112 that complementarily fit together for adjacent windings. For each revolution of the former 102, the racking system 110 moves for a set amount of degrees. The degree of movement can be by a set number of millimeters for each revolution. For example, a 10-12 mm movement will create a 100-120 mm tapered join, and the next section wound on replicates this taper in the opposite direction thus creating the perfect scarf or stepped join.

The former 102 includes a pair of tapered wall segments 114a, 114b. The wall segments 114a, 114b move inwardly to reduce the cross-sectional area (CSA) of the former 102 for winding the material 104. Conversely, the wall segments 114a, 114b move outwardly to increase the CSA of the former 102 for injecting the resin.

The apparatus 100 further includes a tracked vehicle 116 for advancing the apparatus 100 to produce a continuous pipe.

Figure 2:
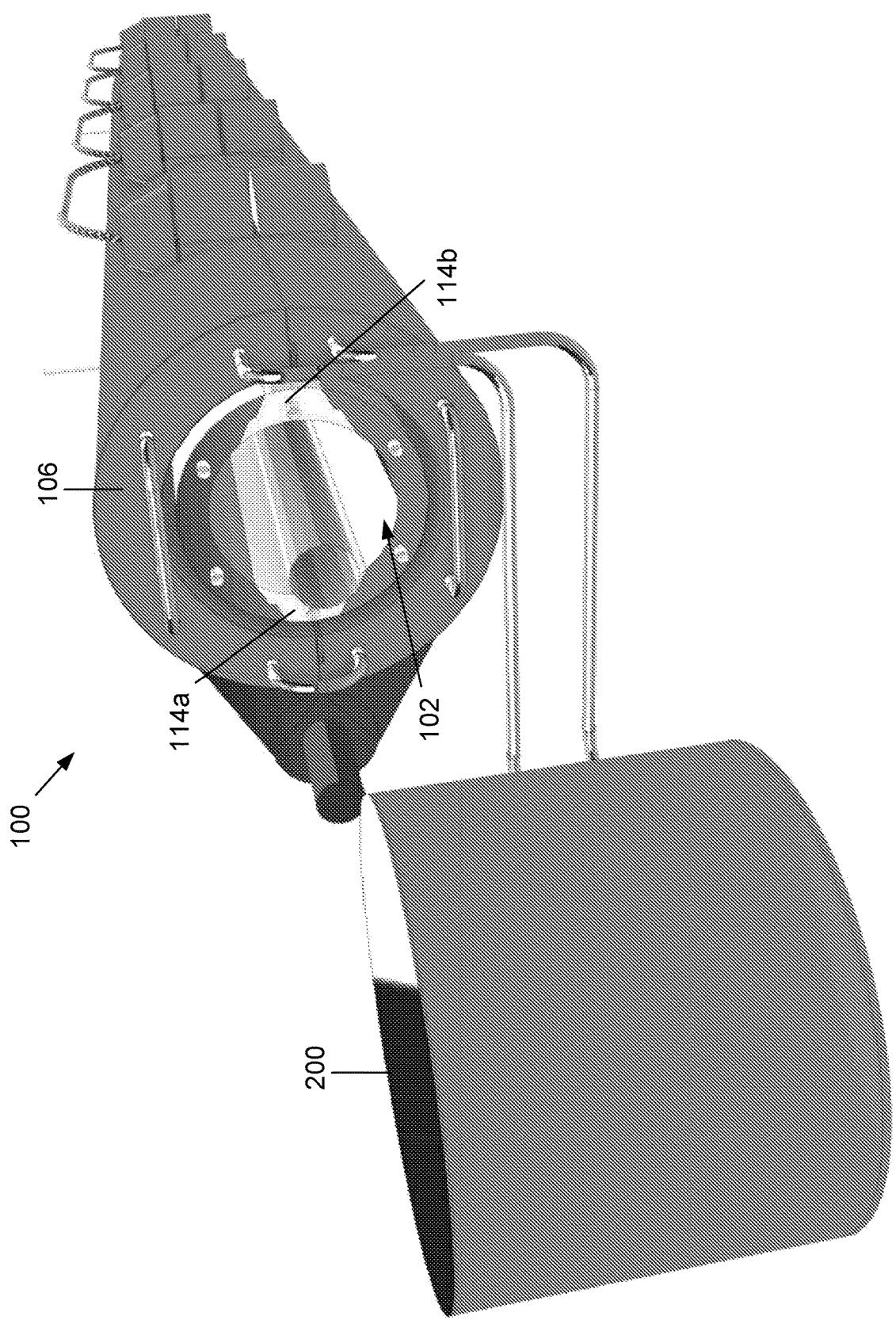
FIG. 2 is a schematic view of the pipe forming apparatus of FIG. 1, with the mold in a closed position.

FIG. 2 shows the mold 106 closed around the former 102 bearing the wound material 104, and ready for injection of the resin. The wall segments 114a, 114b have been moved outwardly to increase the CSA of the former 102 to the inner diameter of the pipe to be formed. The apparatus 100 includes a hot water system 200 for heating the mold 106 by providing hot water at 65° C. through it so as to avoid shocking the injected resin. All pipe materials and components are maintained at a constant temperature ensuring constant quality control and material handling.

Figure 3:
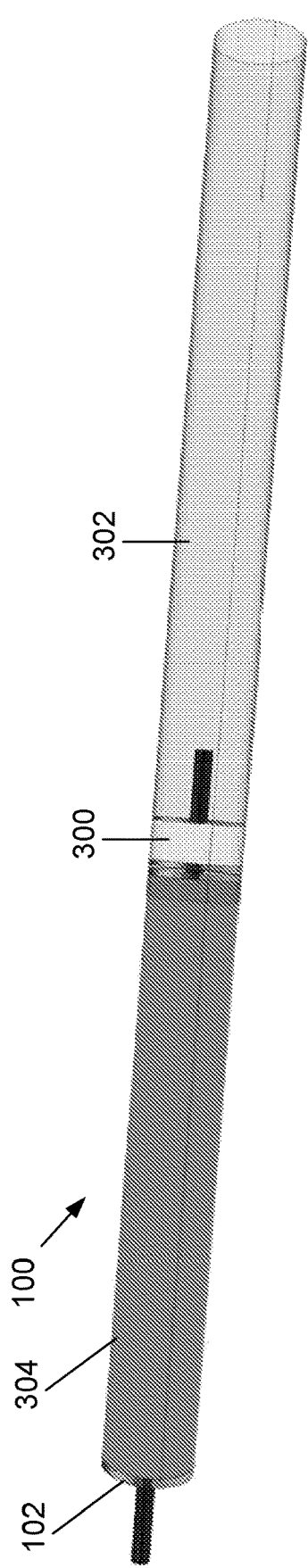
FIG. 3 is a schematic view showing a brake of the pipe forming apparatus of FIG. 1.

Turning to FIG. 3, the apparatus 100 includes a lock brake 300 for locking the former 102 to a completed pipe 302, whilst enabling the former 102 to still rotate when winding material 104 for another adjacent pipe. The brake 300 expands within the completed pipe 302 to lock the former 102 in place, and retracts when advancing the former 102.

The former 102 can rotate while remaining inside the previously cured pipe section 302. A trailing section of the former 102 is separate from the main section that bears the dry material 104. The trailing section is mechanically held to the longer main section of the former 102 via the lock brake 300 that locks it to the cured section 302. In turn, the two former sections are linked with a bearing system allowing the trailing section to remain locked as a brake and not rotate, while the leading section rotates taking on the glass fibre material 104.

The apparatus 100 also includes a sleeve 304 for surrounding the former 102. The sleeve 304 is formed from non-stick silicone material to resist sticking of the resin. The sleeve 304 may also include additional release agents. The mold 106 also includes end seals for sealing against the sleeve 304 to form an airtight cavity in which the wound material 104 is located.

The material 104 includes composite glass fibres, and is provided in sheet form that is about 12 meters wide. Alternatively, the sheet may include components of lesser width that make up 12 metres. The material 104 includes an adhesive applied on its underside to facilitate sticking on the wound material to itself. The adhesive dissolves when the resin is injected.

Figure 4:
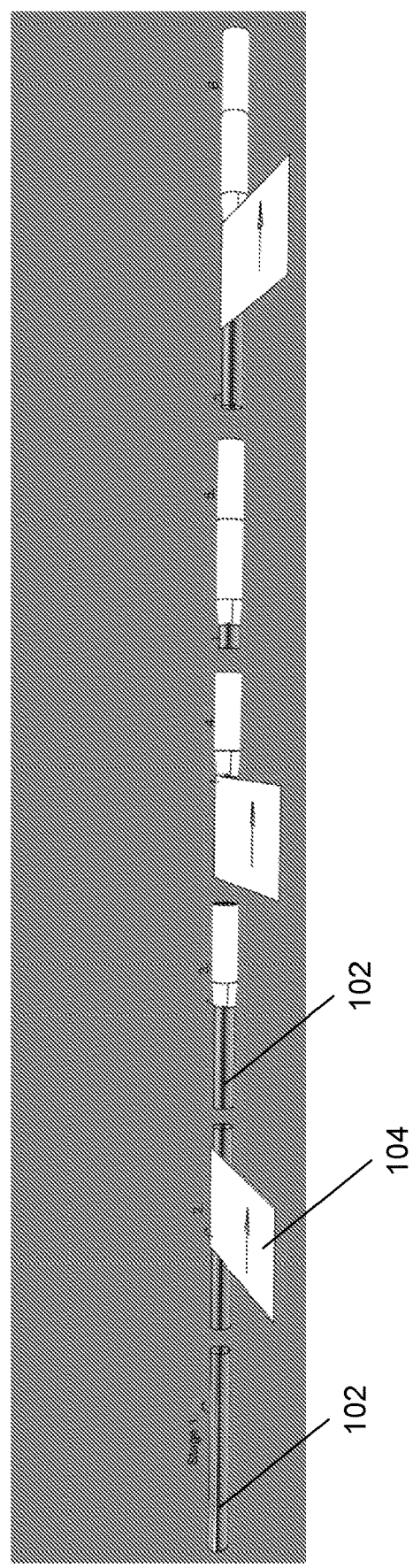
FIG. 4 shows a sequence for forming a continuous pipe using the pipe forming apparatus of FIG. 1.

A method for forming continuous pipe at an installation site using the apparatus 100, is now described with reference to FIG. 4.

Initially at stage 1, the onsite apparatus 100 is provided with a rotatable former 102.

At stage 2, the sheet material 104 is wound, to a predetermined wall thickness, upon the rotating former 102 with a reduced CSA. Adhesive is applied to the dry material 104 between the storage roll and the former 102. The racking system 110 advances the material 104 relative to the rotating former 102 to create the end steps 112.

At stage 3, the first wind is completed. In turn, the mold 106 receives the former 102 bearing the wound material 104. The CSA of the former 102 is increased to the desired inner diameter of the pipe, compressing the layered glass fibres ensuring the ultimate resin to glass ratio. The resin is then injected within the mold 106 to post-impregnate the material 104, completely wetting out the glass fibres leaving a total void free structure. The liquid resin then cures to form the pipe 302.

The CSA of the former 102 is reduced and the apparatus 100 including the former 102 is advanced relative to the cured pipe 302 using the vehicle 116. The brake locks the former 102 to the cured pipe 302.

At stage 4, another pipe is formed adjacent the formed pipe 302 when the sheet material 104 is wound upon the rotating former 102, as previously described in relation to stage 2 above. As before, the resin is injected within the mold 106 to post-impregnate the material 104, and the liquid resin cures to form the adjacent pipe 302.

At stage 5, the two pipes 302 are fitted together at their ends. The joint is received in the mold 106 and molded to securely fasten the pipes together. In this manner, the mold 106 has a small section of annular rings, or a knurling section, providing a mechanical bond. Alternatively, the pipe ends can be adhered or welded together.

At stage 6, the former 102 advances to the next adjacent position to form the next section of the continuous pipe, and so on. In this manner, a continuous composite pipeline can be formed, in 12 meter sections of any diameter and of any nominated wall thickness, with a smooth and undetectable join which is structurally as capable as the main laminate. The completed pipeline is capable of carrying any and all materials currently used in pipelines today.

The apparatus 100 operates on site with minimal external machinery or equipment for support (i.e. cranes, welding, consistent heavy transport). The apparatus 100 produces pipelines for above ground, below ground, above or below rivers, estuaries or ocean environment above or below. Further, the apparatus 100 is automatically controlled by CNC, with GPS guidance and robotically controlled handling systems.

A person skilled in the art will appreciate that many embodiments and variations can be made without departing from the ambit of the present invention.

The apparatus 100 uses and is not limited to all types of polyester, Vinyl Ester, Epoxy, Phenolic resins and plastic polymers and variants available in today's market. The apparatus 100 is not limited to the foregoing resins, and other and new advanced materials may be used as they become available. Further, the curable liquid may include catalysts or hardening agents added to resin.

In one embodiment, prepregs can be used whereby composite material 104 is provided in which a reinforcement fiber is pre-impregnated with a thermoplastic or thermoset resin matrix in a certain ratio.

The material 104 may include carbon fibre, aramid, E-glass, S-glass, Combimat, Mouldmat, and/or combinations and variations.

The tapered joining design described above can be modified and adjusted to suit the variables of the engineers specified design parameters.

In one embodiment, the former 102, in the form of a rotating mandrel uses air pressure which could be released through various apertures/means assisting the pipe release. Air is released through small holes in the mandrel. Small valves like a piston sit flush with the mandrel, and when activated they retract allowing the air pressure to assist a release of the pipe 302.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

What is claimed is:

1. A pipe forming apparatus for forming a pipe at an installation site, said apparatus comprising:
   a holder that holds sheet material;
   a former;
   a racking system for axially advancing the holder relative to the former so that the sheet material is wound around the former to form the pipe with one or more steps at each end of the pipe so that the pipe has two stepped ends, wherein wound material at one end of the pipe forms a complementary fit with the other end;
   a mold for receiving the former bearing the wound sheet material;
   a lock for locking the former to a completed pipe, whilst enabling the former to rotate when winding material for another pipe; and
   an applicator for applying curable liquid within the mold.

2. A pipe forming apparatus as claimed in claim 1, further comprising a transported ISO container providing the material and curable liquid to the site to produce 800 metres of pipeline section.

3. A pipe forming apparatus as claimed in claim 1, wherein the former includes a rotating mandrel.

4. A pipe forming apparatus as claimed in claim 1, wherein a cross sectional area (CSA) of the former is reduced when winding the material, and increased when applying the curable liquid.

5. A pipe forming apparatus as claimed in claim 4, wherein the former includes one or more tapered wall segments that move inwardly when reducing the CSA, and outwardly when increasing the CSA.

6. A pipe forming apparatus as claimed in claim 1, further comprising a sleeve for surrounding the former, the sleeve formed from non-stick or stick resistant material.

7. A pipe forming apparatus as claimed in claim 6, wherein the mold forms an airtight cavity in which the wound material is located, the mold including end seals for sealing against the sleeve.

8. A pipe forming apparatus as claimed in claim 1, wherein the applicator includes an injector and the curable liquid includes a resin.

9. A pipe forming apparatus as claimed in claim 1, wherein the racking system comprises a tracked vehicle for advancing the apparatus to produce a continuous pipe, and wherein the holder holds a roll of the material.

10. A pipe forming apparatus as claimed in claim 1, wherein the material is dry sheet material including composite glass fibres, the material including an adhesive on its underside.

11. A method for forming a pipe at an installation site, said method including:
    reducing cross-sectional area of a former;
    winding material upon the former with the reduced cross-sectional area;
    receiving the former bearing the wound material within a mold;
    increasing the cross-sectional area of the former for applying curable liquid within the mold;
    applying the curable liquid within the mold; and
    locking the former to a completed pipe with a lock, whilst enabling the former to rotate when winding material for another pipe.

12. A method as claimed in claim 11, further comprising advancing relative movement between the former and material during winding.

13. A method as claimed in claim 11, further comprising applying an adhesive to the material prior to winding.

14. A method as claimed in claim 11, further comprising forming another pipe adjacent the formed pipe and fitting the pipes together.

15. A method as claimed in claim 14, further comprising molding the fitted pipes together in the mold.

16. A method as claimed in claim 11, further comprising applying air pressure to release the pipe from the former.

* * * * *